United States Patent Office 3,544,687
Patented Dec. 1, 1970

3,544,687
DIURETICS
Thomas A. Lynch, Columbus, Ohio, assignor to Rohm & Haas Company, Philadelphia, Pa., a corporation of Delaware
No Drawing. Filed Nov. 21, 1966, Ser. No. 595,595
Int. Cl. A61k 27/00
U.S. Cl. 424—317                                    1 Claim

ABSTRACT OF THE DISCLOSURE

Para-tertiary octylphenoxy acetic acid along with several novel analogs and derivatives thereof are shown to possess a high degree of diuretic activity. These compounds are especially useful as diuretics since they combine low toxicity with high effectiveness at promoting sodium excretion with only minimum potassium excretion.

---

This invention relates to the discovery of pharmacological properties in p-tertiary-octylphenoxy acetic acid. This invention further relates to novel analogs and derivatives of p-tertiary-octylphenoxy acetic acid possessing pharmacological properties.

Para-tertiary-octylphenoxy acetic acid is an old compound and well known in the art. Conventionally it is prepared by alkylating phenol with diisobutylene and then reacting the substituted phenol with a halo acetic acid, usually chloroacetic acid.

Prior to the disclosure herein, no pharmacological activity has been reported on this material. However, it has now been determined that this acid, along with certain novel analogs and derivatives thereof possesses a high degree of pharmacological activity. In particular, they are especially useful as diuretics combining low toxicity with high effectiveness at promoting sodium excretion with only a minimum of potassium excretion. Further, the materials of this invention are without a negative effect on uric acid excretion. This latter property is especially important, in that some of the commercially accepted diuretics have a serious depressing effect on uric acid excretion and thereby promote the growth of kidney stones.

The novel compounds of the invention exhibiting diuretic activity other than p-tertiary-octylphenoxy acetic acid may be represented by the following formula:

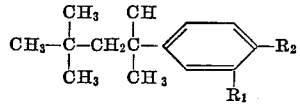

wherein $R_1$ is hydrogen,

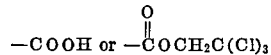

and $R_2$ is —OH, —OCH$_2$CONH$_2$,

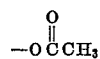

—OCH$_2$COOCH$_3$ or
—OCH$_2$COOC$_2$H$_5$; except that when $R_1$ is hydrogen, $R_2$ cannot be
—OH. Para-tertiary-octylphenoxy acetic acid may also be designated in accordance with the above formula. In that instance, the symbols $R_1$ and $R_2$ would represent hydrogen and
—OCH$_2$COOH respectively.

So as to demonstrate the preparation of the novel compounds disclosed herein, the following examples are offered by way of illustration and not by way of limitation.

EXAMPLE 1

Preparation of 5-t-octylsalicylic acid

A mixture of 206 g. (1.0 mol.) of 4-t-octylphenol, 414 g. (3.0 mols.) anhydrous potassium carbonate, and 175 g. (3.97 mol.) crushed Dry Ice (solid $CO_2$) was sealed into a two-liter autoclave capable of withstanding a pressure of 1000 p.s.i. internal pressure. This mixture was then heated to a temperature of 180–200° C. for 18 to 20 hours. (During this time the pressure reached 400–500 p.s.i.) At the end of this time the autoclave and its contents were cooled to room temperature, vented to atmospheric pressure, and the autoclave opened. The reaction mixtures was dissolved in 700 g. of 50% aqueous isopropanol and placed in a 2 liter separatory funnel. A lower aqueous salt layer was separated and discarded. The upper aqueous isopropanol layer was diluted with 500 ml. of water and washed 3 times with heptane (200 ml. portions). Thereafter, it was evaporated to one half volume, cooled in an ice bath and acidified to a pH of 1 to 2 by the addition of concentrated hydrochloric acid. A pinkish white solid precipitated and was removed by filtration, washed with water and air dried. It was then recrystallized with carbon treatment from aqueous ethyl alcohol and twice from heptane. In this manner, 120.9 g. (48.3% yield) of 5-t-octylsalicylic acid of the formula

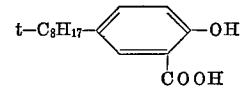

and having a melting point of 158° to 160° C. was obtained.

Analytical determinations for this material were as follows:

Calculated for $C_{15}H_{22}O_3$ (percent): C, 71.96; H, 9.25.
Found (percent): C, 71.79; H, 9.28.

EXAMPLE 2

Preparation of 4-t-octylphenoxyacetamide

A sufficient amount of 4-t-octylphenoxy acetyl chloride was prepared by reacting in the presence of benzene 4-t-octylphenoxyacetic acid with thionyl chloride. Thereafter, 300 ml. of anhydrous ethyl alcohol was placed in a 500 ml. round bottom, three-neck flask, equipped with a mechanical stirrer, a gas dispersion tube and a reflux condenser. This flask was cooled in an ice bath while gaseous ammonia was added through the gas dispersion tube until the weight gain indicated 17 g. (1.0 mol.) of ammonia had dissolved in the alcohol. The ice bath was removed and the gas dispersion tube replaced with a dropping funnel. Crude 4-t-octylphenoxy acetyl chloride (70.6 g.; 0.25 mol.) was added dropwise, from the dropping funnel, over a 20 minute period, with vigorous stirring and cooling sufficient to keep the temperature at 35° C. The mixture was then stirred for 2 hours at room temperature and then heated to 70° C. to remove any unreacted ammonia. The reaction mixture was then cooled and filtered to remove 8.1 g. of ammonium chloride and the filtrate was evaporated to dryness, under reduced pressure. A resulting light tan solid residue was washed well with water, recrystallized once from aqueous ethyl alcohol and twice from heptane. In this manner, there was obtained 52.7 g. of a white solid constituting an 80% yield of a compound having the formula

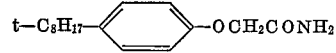

and a melting point of 95°–97° C.

Analytical determinations for this material were as follows:

Calculated for $C_{16}H_{25}NO_2$ (percent): C, 73.00; H, 9.51; N, 5.32. Found (percent): C, 73.13; H, 9.58; N, 5.14. N, 5.14.

EXAMPLE 3

Preparation of acetyl 5-t-octylsalicylic acid

A mixture consisting of 30 g. (0.119 mol.) of 5-t-octylsalicylic acid, 12.3 g. (0.12 mol.) acetic anhydride and 89 ml. of benzene was placed in a 500 ml., round bottom, three-neck flask equipped with a mechanical stirrer, a reflux condenser and a thermometer. Seven (7) drops of concentrated sulfuric acid were added and the mixture was heated to reflux (86° C.) for four hours. At the end of this time the mixture was cooled, diluted with 200 ml. of benzene and washed (in a separatory funnel) twice with 200 ml. portions of water. The benzene solution was then dried over anhydrous magnesium sulfate and evaporated to dryness. Recrystallization of the residue twice from heptane gave 24.8 g. (71% yield) of white solid of the formula

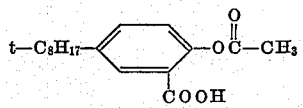

and having a melting point of 96° to 97° C.

Analytical determinations for this material were as follows:

Calculated for $C_{17}H_{24}O_4$ (percent): C, 69.83; H, 8.27. Found (percent): C, 69.73; H, 8.27.

EXAMPLE 4

Preparation of ethyl 4-t-octylphenoxy acetate

A mixture of 39.6 g. (0.15 mol.) of 4-t-octylphenoxyacetic acid, 9.0 g. (0.18 mol.) anhydrous ethyl alcohol, 200 ml. dry benzene, and 5 g. of a dry macroreticular, sulfonic acid type ion-exchange resin was placed in a 500 ml. round bottom, three-neck flask, equipped with a mechanical stirrer, a thermometer and a reflux condenser having a Dean Stark water trap between the flask and condenser. This mixture was stirred under reflux for 6 to 20 hours or until no more water could be removed from the trap. At the end of this time the mixture was cooled, and filtered to removed the ion-exchange resin. The filtrate was then stirred for 15 minutes with 1 g. of calcium hydroxide and again filtered. Thereafter, the filtrate was concentrated under reduced pressure to remove the benzene. The heavy pale yellow oily residue was distilled through a short packed column under reduced pressure. In this manner, there was obtained 38 g. (86.7% yield) of colorless oil of the formula

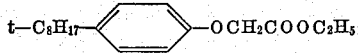

and having a boiling point of 100° to 103° C. at 0.003 mm.

Analytical determinations for this material were as follows:

Calculated for $C_{18}H_{28}O_3$ (percent): C, 73.97; H, 9.59. Found (percent): C, 73.85; H, 9.99.

EXAMPLE 5

Preparation of 2,2,2-trichloroethyl 5-t-octylsalicylate

A mixture of 50 g. (0.2 mol.) of 5-t-octylsalicylic acid, 100 g. (0.67 mol.) of 2,2,2-trichloroethanol, 300 g. dry benzene, and 10 g. of a dry macroreticular, sulfonic acid type ion-exchange resin was placed in a one liter round bottom, three-neck flask. The flask was equipped with a mechanical stirrer, a thermometer, and a reflux condenser having a Dean Stark water trap situated between the flask and condenser. The flask and contents were heated to reflux (88° to 92° C.) for 18 hours, or until 3.2 ml. of water had collected in the water trap. The mixture was then filtered hot to remove the ion-exchange resin and evaporated to dryness. The residue was recrystallized from heptane giving 21.7 g. (.087 mol.) of starting 5-t-octylsalicylic acid. The heptane solution from this recrystallization was evaporated and the residue was distilled under reduced pressure giving a colorless oil (B.P. 146°–147° at 0.5 mm.). After standing, the oil solidified to give 30.4 g. (70.5% yield) of a white solid of the formula

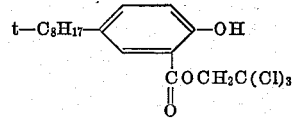

and having a melting point of 50° to 51° C.

Analytical determinations for this material were as follows:

Calculated for $C_{17}H_{23}Cl_3O_3$ (percent): C, 53.48; H, 6.07; Cl, 27.86. Found (percent): C, 55.23; H, 6.35; Cl, 27.61.

Diuretic activity of p-tertiary-octylphenoxy acetic acid and its congeners was experimentally determined in the manner hereinafter described.

Male beagle dogs were catheterized to empty their urinary bladder and loaded subcutaneously with normal saline at a level of 10 ml./kg. of body weight. Each of the test compounds was then administered orally to the dogs (10 mg./kg. of body weight). Placebo dogs were treated in the same manner as the dogs receiving a test compound except that no test compound was administered to them. Spontaneous urine volume was collected for 24 hours by placing the dogs in individual cages equipped for such a function. After 24 hours, the urinary bladder was again catheterized. At this point, total urine volume was measured and analyzed for its sodium and potassium content. A known diuretic compound; namely, chlorothiazide, was also included to determine the relative effectiveness of the compounds under observation.

The results of these experiments are given in Table I expressed in terms of relative diuretic activity of each material based on the sodium content of the urine. By using an oral dosage of 2.5 mg./kg. of body weight of chlorothiazide as a standard, the relative diuretic activity was calculated in accordance with the following formula:

Relative diuretic activity $$= \frac{\text{Meq. Na+/kg. (test compound-placebo)}}{\text{Meq. Na+/kg. (chlorothiazide-placebo)}}$$

TABLE I.—DIURETIC ACTIVITY IN DOGS

[Urine excretion values/kg./24 hours]

| Test compound | Urine volume, ml. | Na+, mEq. | K+, mEq. | Relative diuretic activity |
|---|---|---|---|---|
| (1) Placebo | 6.62 | 1.08 | 0.53 | |
| (2) Chlorothiazide | 12.4 | 2.73 | 0.98 | 1.0 |
| (3) 4-t-octylphenoxyacetic acid | 12.5 | 2.81 | 0.59 | 1.05 |
| (4) 4-t-octylphenoxyacetamide | 14.4 | 2.78 | 0.89 | 1.03 |
| (5) Acetyl 5-t-octylsalicylic acid | 16.7 | 2.65 | 0.64 | 0.95 |
| (6) Ethyl 4-t-octylphenoxyacetate | 15.0 | 2.58 | 0.71 | 0.92 |
| (7) 2,2,2-trichloroethyl-5-t-octylsalicylate | 13.2 | 2.58 | 0.72 | 0.92 |
| (8) 5-t-octylsalicylic acid | 14.6 | 2.37 | 0.59 | 0.78 |

As shown in Table I, 4-t-octylphenoxyacetic acid and its congeners displayed diuretic activity which was comparable to chlorothiazide, a known diuretic. Of particular significance in the data so recorded is the very low potassium excretion exhibited and at the same time there is evidenced a very high sodium excretion. It is this phenomenon of high sodium and low potassium excretion which especially makes the present invention such a valuable advance in the art.

Toxicity tests on rats demonstrated that the active dose was far below the lethal dose. In this regard, p-tertiary-octylphenoxyacetic acid was found to have an $LD_{50}$ in excess of 1050 mg. per kg. of body weight. This is approximately the same kind of toxicity exhibited by aspirin.

With regard to the ceiling effect dosage of p-tertiary-octylphenoxyacetic acid in promoting sodium excretion, this was found to be 10 mg. per kg. of body weight. Similar results were obtained for the other diuretic compounds disclosed herein.

Para-tertiary-octylphenoxyacetic acid and its congeners may be administered alone or more preferably in combination with pharmaceutically acceptable carriers. While such carriers are usually inert, it may be advantageous in certain situations for them to also have a particular therapeutic or pharmacological value. Formulation of the diuretics of this invention may, for example, constitute powders, capsules, suppositories, solutions, emulsions, and the like. Generally, coated tablets and capsules containing the diuretics are preferable.

In order to effect diuresis in a patient amenable to diuretic therapy, it is preferred to orally administer to such patient an effective or diuretic amount of the compounds or compositions of this invention. However, where desired or necessary, intravenous administration may be utilized. In these situations, one might typically neutralize the p-tertiary-octylphenoxyacetic acid or its congeners in sodium hydroxide to form a soluble 1% aqueous solution. Such a solution is merely suggestive and by no means exclusive since various modifications in types of solutions and effective concentrations would be within the skill of one knowledgeable in the art.

Dosage requirements in humans will of course vary with the individual being treated. Factors, such as the severity of sodium retention, general health of the patient, his tolerances, and the like will have a substantial bearing on the exact amount which will render the therapeutic effects desired. Generally, a daily adult dosage of 1 to 2 grams will usually prove to be satisfactory.

While the examples previously delineated have described in detail the preparation of certain specific compounds, it is to be understood that the invention is not limited by the particular reaction conditions described for the preparation of the compounds or by the exact ingredients included in pharmaceutical compositions. On the contrary, this invention embraces variations and modifications including the use of equivalent methods of preparation. However, it is further understood that this invention is specifically limited to the compounds defined in the claim and does not extend to the substitution of any other groups for those which are so defined.

What is claimed is:

1. A method of effecting diuresis in a patient amenable to diuretic therapy which comprises administering to said patient a diuretic amount of

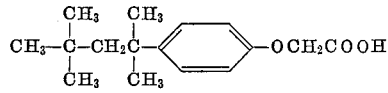

References Cited

UNITED STATES PATENTS 3,411,939  11/1968  Hunter et al. _____ 117—121

OTHER REFERENCES

Chemical Abstracts 59: 2720 (f) (1963).

JEROME D. GOLDBERG, Primary Examiner

U.S. Cl. X.R.

260—473, 479, 521, 558, 559; 424—308, 311, 324